United States Patent [19]
Kolbly

[11] 3,753,116
[45] Aug. 14, 1973

[54] POCKET SIZE MICROWAVE RADIATION HAZARD DETECTOR

[75] Inventor: Richard B. Kolbly, Barstow, Calif.

[73] Assignee: California Institute of Technology, Pasadena, Calif.

[22] Filed: Oct. 20, 1970

[21] Appl. No.: 82,369

[52] U.S. Cl. ............................................. 325/363
[51] Int. Cl. ............................................. H04b 1/00
[58] Field of Search ..................... 325/363, 364, 67; 340/261

[56] References Cited
UNITED STATES PATENTS

| | | | |
|---|---|---|---|
| 1,787,940 | 1/1931 | Garbutt............................... | 346/108 |
| 3,489,241 | 1/1970 | Steinberg............................ | 340/261 |
| 3,465,253 | 9/1969 | Rittenbach......................... | 325/364 |
| 3,317,841 | 5/1967 | Umanoff.............................. | 325/364 |
| 3,094,663 | 6/1963 | Siegel.................................. | 325/364 |
| 2,963,888 | 12/1960 | Wilson................................. | 325/364 |
| 3,638,210 | 1/1972 | Hankins et al..................... | 340/261 |

Primary Examiner—Robert L. Griffin
Assistant Examiner—Barry Leibowitz
Attorney—Lindenberg, Freilich and Wasserman

[57] ABSTRACT

A microwave radiation hazard detector in which CW radiation is detected and converted into a DC voltage whose level is a function of the radiation level. This signal's level is compared with an adjustable level of a DC voltage by a comparator to which the signals are DC coupled. Only when the level of the former exceeds the adjustable level is an alarm-indication output provided by the comparator. This output is used to activate a tone producing unit, lamps or any other indicator which is used to indicate to personnel the fact that they are exposed to radiation above a safe level.

2 Claims, 6 Drawing Figures

3,753,116

INVENTOR.
RICHARD B. KOLBLY

BY
Lindenberg Freilich & Wasserman
ATTORNEYS

INVENTOR.
RICHARD B. KOLBLY

POCKET SIZE MICROWAVE RADIATION HAZARD DETECTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates generally to a hazard detector and, more particularly, to a system for detecting microwave radiation and for providing an alarm indication whenever the radiation exceeds a preselected safe level.

2. Description of the Prior Art

With the on rush of microwave high level equipment such as microwave transmitters, and ovens an urgent need has arisen for a device or system, capable of providing an alarm indication whenever the detected microwave radiation exceeds a preselected level which is regarded as safe. Preferably, the device should be small and reliable, so that it could be carried by the personnel which may be subjected to the dangerous radiation. Also, it is desirable that it be inexpensive to enable its wide usage. A further desired property of such a device is the ability to select the level of radiation which need be detected to produce the desired alarm indication. None of the prior art microwave detectors possess all of these properties. Typically, prior art microwave detectors are designed to detect very weak signals, typical of those detectable by electronic counter measures. Due to these weak signals high gain amplifiers and filtering arrangements are required. Consequently, the overall complexity and therefore the cost of the detector are relatively great. Also, typical prior art detectors do not include means for enabling the adjustment of the detector so that only when a signal above a predetermined level is detected is an alarm indication produced. This is particularly desirable in a microwave hazard detector, since quite often different standards are set for what is regarded as a hazard radiation level.

OBJECTS AND SUMMARY OF THE INVENTION

It is a primary object of the present invention to provide a new microwave radiation detector.

Another object of the present invention is to provide a very reliable, yet simple microwave radiation detector which is small and light weight so that it can be carried by personnel, working adjacent high power microwave equipment, to provide them with an alarm indication whenever the detected radiation exceeds a safe level.

A further object of the invention is to provide a microwave radiation detector of the type described in the preceding paragraph in which the safe level is easily adjustable.

These and other objects of the present invention are achieved by providing in a microwave hazard detector an antenna and a detector whose output is a DC signal of a level which is directly related to the microwave radiation level, such as the power density detected by the antenna. This DC signal is compared by a simple comparator with another DC signal whose level is adjustable. Only when the level of the former exceeds the level of the signal, whose level is adjustable, does the comparator provide an output with a true level, which represents a hazard indication, and which will be referred to hereafter as the true output or a hazard-indication output. In a detector to be carried by personnel, the hazard indication output of the comparator may be used to activate an oscillator which together with an audio amplifier and small speaker provide an audible hazard-indicating tone or sound. The hazard indication output may be used together with nonportable devices to activate an interlock system to shut down the equipment. It may also be used to activate a warning device to alert the personnel around the microwave equipment or other condition-monitoring devices of the hazardous condition, represented by the detection of microwave radiation above a safe level.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
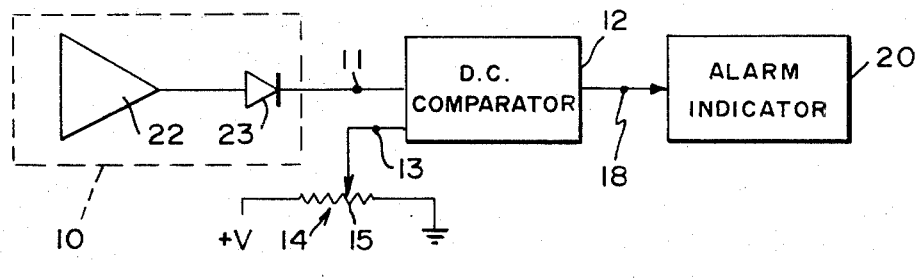
FIG. 1 is a block diagram of the novel detector of the present invention.

In the most generic form, the present invention comprises an input detection unit 10, which provides a DC signal or voltage at a terminal 11, which is connected to one input of a DC comparator 12. The level of the DC voltage at terminal 11 is directly related to the microwave radiation level, detected by unit 10.

The DC voltage level at terminal 11 is compared with the level of a DC voltage applied to a terminal 13 by an adjustable DC reference voltage source 14. The latter is shown comprising a potentiometer 15 connected across a DC voltage, e.g., +V. Thus, the voltage level at terminal 13 is a function of the position of the moving arm of potentiometer 15. The DC comparator 12 provides an output of a true level at an output terminal 18 only when the level at terminal 11 exceeds the level at terminal 13. SUch a true output activates an alarm indicator 20.

The level at terminal 13 is selected so that as long as the detected microwave radiation is within a safe level (in terms of milliwatts per centimeter) the level at terminal 11 does not exceed that at terminal 13. Consequently, the comparator output does not activate the indicator 20. However, as soon as the detected radiation exceeds the safe level, the DC level at terminal 11 exceeds the level at terminal 13. Consequently, the comparator provides a true output level which activates indicator 20. Thus, the circuit provides simple means for selecting the safety level of the detected radiation, above which an alarm indication is provided. The voltage from source 14 may be thought of as setting the sensitivity or threshold of comparator 12, since it controls the level of the voltage which is needed at terminal 11 to produce a true output level at terminal 18.

As shown in FIG. 1, the input detection unit comprises a microwave antenna 22 and a detector represented by a diode 23 whose output, which is a DC voltage, is applied directly to terminal 11.

Prior art devices designed to detect microwave radiation are generally designed to detect very weak signals which complicates the antenna and detection circuitry and requires significant amplification and filtering to distinguish the detected signals from noise. Also, in all known prior art devices, the detected signals are AC coupled to the circuitry which uses the detected signals. Usually, the AC coupling is provided by a capacitor located in the signal path. Also, in prior art devices which detect continuous wave (CW) radiation, the detected signals are first modulated to activate the rest of the circuitry, while those devices which receive modulated radiation utilize the modulated radiation rather than the carrier signal. In addition, none of the prior art microwave radiation detectors includes an arrangement whereby an alarm indication is only provided when the detected radiation exceeds a selected safe level.

Unlike such prior art devices, in the present invention the input detection unit 10 responds to CW radiation and provides a DC voltage which is DC coupled to the succeeding circuitry, rather than AC coupled as in the prior art. The invention is primarily directed to detect radiation from devices such as microwave heating devices, e.g., electronic ovens and microwave carrier systems, such as microwave telemetry systems in which for all practical purposes the radiation is CW. Also, since the present invention is directed to a radiation hazard detector, it is designed to detect high level microwave radiation, e.g., 1mw per cm or greater in the frequency range of about 2 to 10 GHz, though not limited thereto.

It should be appreciated that the high level radiation which unit 10 is designed to detect and the fact that the unit's output is directly coupled to terminal 11 greatly simplifies the design of the antenna 22 which together with detector 24 provide a DC voltage whose level is directly related to the power or power density of the detected radiation. Once this DC level is provided, potentiometer 15 and DC comparator 12 are all that is required to select the safe radiation level which when exceeded provides an activating signal to indicator 20. Thus, by varying the position of the moving arm potentiometer 15, the safe level may be easily selected.

Based on the foregoing description it should be apparent that various types of antennas and detectors may be used in implementing antenna 22 and detector 23 to provide, in response to high level microwave radiation which is effectively CW, a DC voltage whose level is a function of the detected level (power density) of the radiation. One embodiment of such an arrangement will be described later as an example rather than as a limitation on the teachings disclosed herein. Likewise, the alarm indicator 20 may assume different forms and be embodied in different ways depending on the invention's ultimate use.

When the invention is used as a microwave radiation hazard detector to be carried by each person working adjacent CW type radiation equipment, the alarm indicator may comprise an audio oscillator 25 (FIG. 2) which is activated by the true output level at terminal 18. The oscillator's output is shown connected to an audio amplifier 28 whose output activates a speaker 30, which provides an audible tone which is dependent on the oscillator's frequency, e.g., 1,000 pps. Such an audible tone would alert the person that he is in an area in which the microwave radiation exceeds a safe level as established by the DC voltage level, provided by source 14. In practice, the entire circuitry shown in FIG. 1 can be packaged into a unit, not larger than a pocket size transistor radio.

Figure 3:
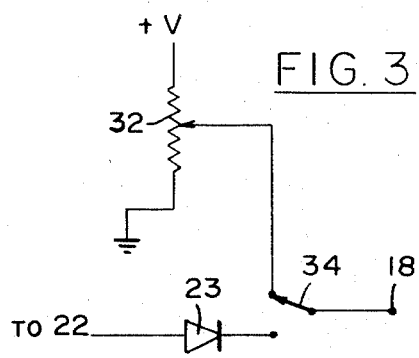
FIG. 3 is a partial schematic diagram of another embodiment of the invention.

In such an embodiment it may be desirable to enable the person to check the operability of the circuitry prior to entering a zone where he may be subjected to dangerous radiation. This may be accomplished by incorporating a second potentiometer 32 (FIG. 3) and a switch 34. Either the moving arm of 32 or the output of diode 23 is couplable to terminal 11 through a switch 34. The potentiometer 32 which is connected across +V is set so that its arm is at a DC voltage level equivalent to that provided by diode 23 when the detected radiation is above a safe level. Thus, by connecting terminal 11 to the arm of potentiometer 32 (as shown) if the battery (+V) and the electronic circuitry are operational an audible tone is provided by the speaker 30.

Figure 2:
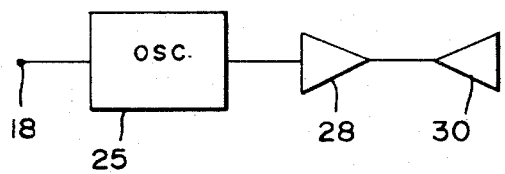
FIG. 2 is a block diagram of one embodiment of an alarm indicator.
Figure 4:
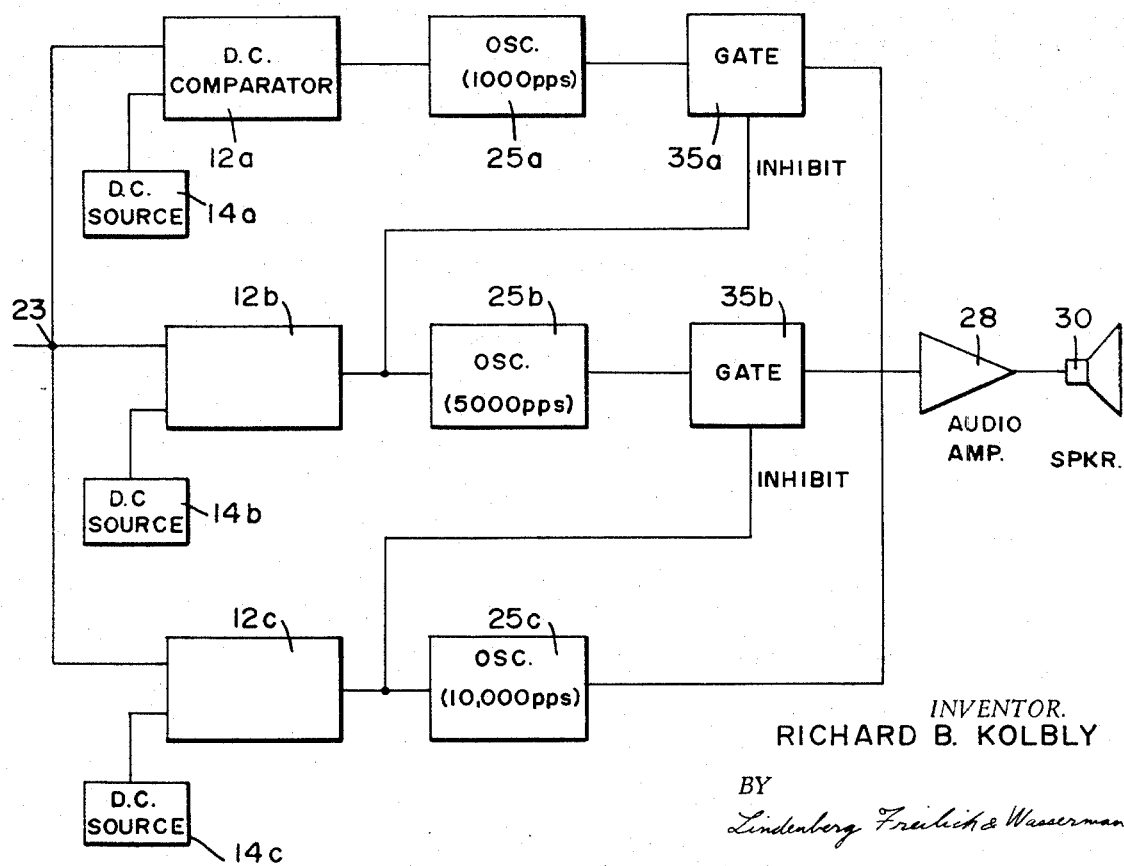
FIGS. 4 and 5 are partial block diagrams of other embodiments of the invention.

If desired, the arrangement shown in FIGS. 1 and 2 may be expanded to include more than one comparator 12 and reference DC voltage source 14. Each comparator can be set to respond to a different sensitivity level. Each comparator may activate a different oscillatory 25, set to a different frequency so that the frequency of the audible tone from speaker 30 would be indicative of a different range of detected microwave radiation level. An example of such an arrangement with three comparators 12a, 12b and 12c, three DC sources 14a, 14b and 14c, three oscillators 25a, 25b and 25c and two gates 35a and 35b is shown in FIG. 4. Gate 35a is assumed to be closed when the output of 25b is true. Likewise, gate 35b is closed when the output of comparator 25c is true.

Let it be assumed that oscillators 25a, 25b and 25c, when activated, are set to provide frequencies of 1,000, 5,000 and 10,000 pps respectively. Let it further be assumed that sources 14a, 14b and 14c are adjusted so that when the detected radiation level exceeds $R_1$ only the output of 12a is true, when the level exceeds $R_2$ the output of 12b is also true and when the level exceeds $R_3$ comparator 12c is also activated to provide a true output level. From the foregoing it should thus be appreciated that as long as the radiation level is below $R_1$ no audio tone is produced. When the radiation level is between $R_1$ and $R_2$, only oscillator 25a is activated. Thus, a 1,000 cps tone is produced. Between $R_2$ and $R_3$ both oscillators 25a and 25b are active. However, gate 35a is closed. Thus, the audible tone is controlled by the 5,000 pps from oscillator 25b. Then when the radiation exceeds $R_3$ even though all the three oscillators are active, since both gates 35a and 35b are closed, the audible tone frequency is that provided by oscillator 25c, i.e., 10,000 cps. Thus, the audible tone frequency in addition to indicating a hazard condition by its presence, is indicative of the range of the level of the detected radiation.

It should be stressed that the ability to determine the range of the radiation level is greatly facilitated by the use of the comparators since each is easily set to provide a true output when the detected radiation exceeds a particular radiation level. Also, the fact that in the present invention the detected radiation is DC coupled to each DC comparator, which compares that DC voltage level with the level of the DC voltage from a source, such as source 14, greatly simplifies the required circuitry, and increases its reliability.

Figure 5:
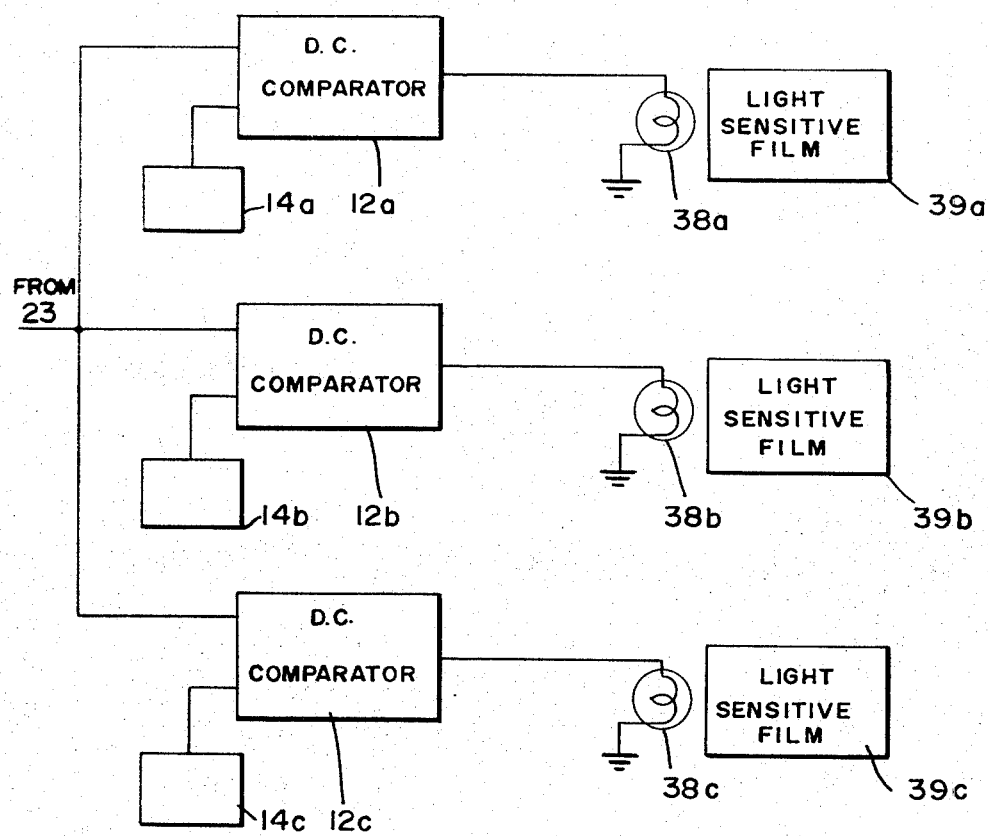

If desired the outputs of comparators 12a, 12b and 12c can be used to provide an indication of the length of time a person is exposed to levels of radiation in different ranges. An arrangement capable of providing such an indication is shown in FIG. 5 wherein the true outputs of DC comparators 12a, 12b and 12c are assumed to energize lamps 38a, 38b and 38c respectively. The latter in turn expose separate photosensitive strips 39a, 39b and 39c respectively. Thus, the different exposures of the various strips are indicative of the length of exposure and the range of the radiation level to which a person, carrying such an embodiment, has been exposed. If desired, gates such as gates 35a and 35b may be incorporated so that at any time not more than one lamp is illuminated, the illuminated lamp being dependent on the range of the radiation level at the particular point in time.

Figure 6:
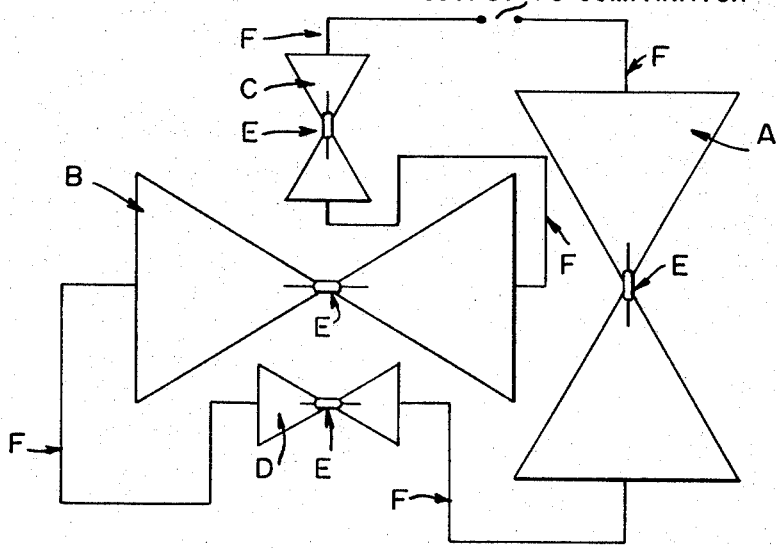
FIG. 6 is a diagram of one embodiment of an input detection unit, shown in FIG. 1.

As previously pointed out, various antenna designs may be employed in the implementation of the radiation detection input unit 10 consisting of antenna 10 and detector 23. For example, the antenna can consist of a series of bowtie antennas (see FIG. 6), with individual detectors connected in series. Each antenna covers an approximate frequency range of 3:1, so the frequency range of the entire array is approximately 9:1. The individual bowtie dipoles are arranged in such a manner that they respond to any incident polarization, with the outputs of all elements being in series. Dipoles A and B are designed to respond to the lower-frequency signals and dipoles C and D respond to the high-frequency signals. Elements A and C are sensitive to one plane of polarization, and elements B and D respond to the orthogonal polarization components. The individual detectors (E) are located at the low-impedance points of each element and all are connected in series by choke sections (F). This is just one example of an antenna-detector unit that could be used with this invention. Others could be tailored to the frequency response and power level desired.

There has accordingly been shown and described herein a novel microwave radiation hazard detector, in which the detected radiation level is provided in the form of a DC voltage level which is DC coupled to a DC comparator, whose sensitivity is adjustably controlled by means of a DC reference voltage with a controlled level, which represents the level above which a hazard condition is assumed to be present. When the detection radiation indicating DC voltage level exceeds the level of the reference voltage, the comparator provides a true output which triggers any one of different embodiments of an alarm indicator. Herebefore the alarm indicator has been described in conjunction with an audible tone or film exposing lamps. Clearly, other use may be made of the true output or outputs of one or more of the comparators herebefore described. For example, the true outputs of the comparators may be used to activate an interlock system to shut down the equipment. Also it may be used to activate a general alarm device to alert the personnel in the radiation zone to the danger which is present by the excessive radiation above a safe level. Thus, all such modifications and equivalents are deemed to fall within the invention as claimed in the appended claims.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A continuous wave microwave radiation detector comprising:

input means including an antenna for detecting continuous wave microwave radiation and for providing a DC voltage whose level is a direct function of the detected radiation level;

a plurality of comparators each being directly connected to said input means to compare said DC voltage with a different DC reference voltage, each DC reference voltage representing a different level of detected radiation, each comparator providing an output signal of a selected level when the level of the DC voltage from said input means is not less than the DC reference voltage level supplied thereto; and output means responsive to the output signals of said comparators for providing a first output when the DC voltage from said input means is less than the lowest DC reference voltage, thereby indicating that said detected radiation level is in a first range, for providing a second output when the DC voltage from said input means is not less than the lowest DC reference voltage but less than a second DC reference voltage which is greater than the lowest DC reference voltage, thereby indicating that the level of the detected radiation is in a second range higher than said first range, and for providing a third output when the DC voltage from said input means is not less than the second DC reference voltage, thereby indicating that the level of the detected radiation is in a third range said output means further including inhibitor means responsive to said second output for inhibiting said first output, and responsive to said third output for inhibiting both said first and second outputs, higher than said second range.

2. The arrangement as recited in claim 1 wherein said second output is an audible tone of a first frequency, and said third output is an audible tone of a second frequency.

* * * * *